US006268038B1

(12) United States Patent
Porte et al.

(10) Patent No.: US 6,268,038 B1
(45) Date of Patent: Jul. 31, 2001

(54) ACOUSTICALLY RESISTIVE LAYER, PROCESS FOR PRODUCTION OF THIS LAYER AND ABSORBENT ACOUSTIC PANEL PROVIDED WITH AT LEAST ONE SUCH LAYER, AS WELL AS ITS PROCESS FOR PRODUCTION

(75) Inventors: Alain Porte, Colomiers; Robert Andre, Auzeville Tolosane; Hervé Batard, Tournefeuille, all of (FR)

(73) Assignee: Aerospatiale Societe Nationale Industrielle, Paris Cedex (FR)

(*) Notice: Subject to any disclaimer, the term of this patent is extended or adjusted under 35 U.S.C. 154(b) by 0 days.

(21) Appl. No.: 09/133,678

(22) Filed: Aug. 13, 1998

(30) Foreign Application Priority Data

Aug. 13, 1997 (FR) ..................................... 97 10490

(51) Int. Cl.[7] ..................................... B32B 3/12
(52) U.S. Cl. ..................................... 428/116
(58) Field of Search ..................................... 428/116, 118

(56) References Cited

U.S. PATENT DOCUMENTS 4,042,745 * 8/1977 Cornwell et al. .................... 428/310
4,073,998 * 2/1978 O'Connor ............................ 428/310
4,600,619 7/1986 Chee et al. .
5,364,681 11/1994 Pate et al. .

FOREIGN PATENT DOCUMENTS 0 367 135 5/1990 (EP) .
0 509 166 10/1992 (EP) .
2 735 064 12/1996 (FR) .
2 261 846 6/1993 (GB) .
08323901 12/1996 (JP) .

* cited by examiner

*Primary Examiner*—Francis J. Lorin
(74) *Attorney, Agent, or Firm*—Young & Thompson

(57) ABSTRACT

An acoustically resistive layer comprises at least one layer (12) of acoustic damping cloth and a reinforcing material comprising a sheet (14, 114, 214, 314) of filaments (16) secured to the acoustically damping cloth. The filaments (16) are disposed unidirectionally, bidirectionally or multi-directionally. A process for producing such an acoustically resistive layer, comprises positioning an acoustically damping cloth (12) on a mold (18) having the shape of the layer to be obtained, and disposing on this acoustically damping cloth filaments (16) impregnated with a binder by filamentary winding, and then withdrawing the layer thus obtained from the mold, or by laying with application of pressure, and withdrawing the layer thus obtained from the mold.

5 Claims, 7 Drawing Sheets

FIG.7D
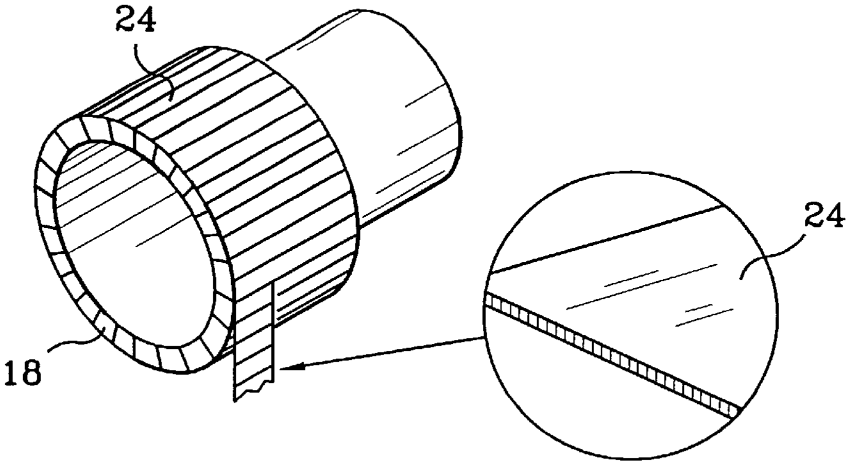
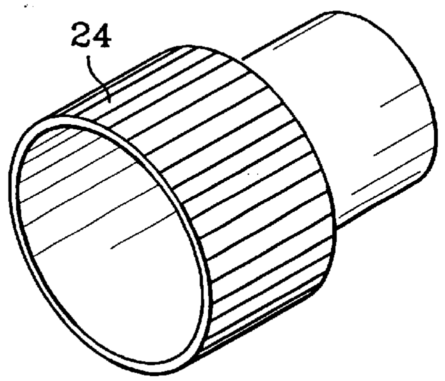
FIG.7E
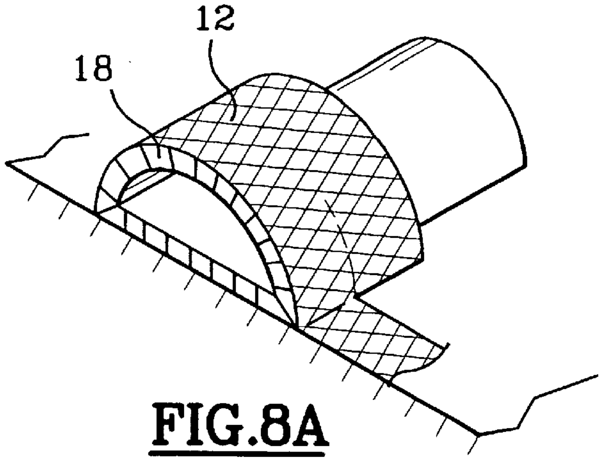
FIG.8A
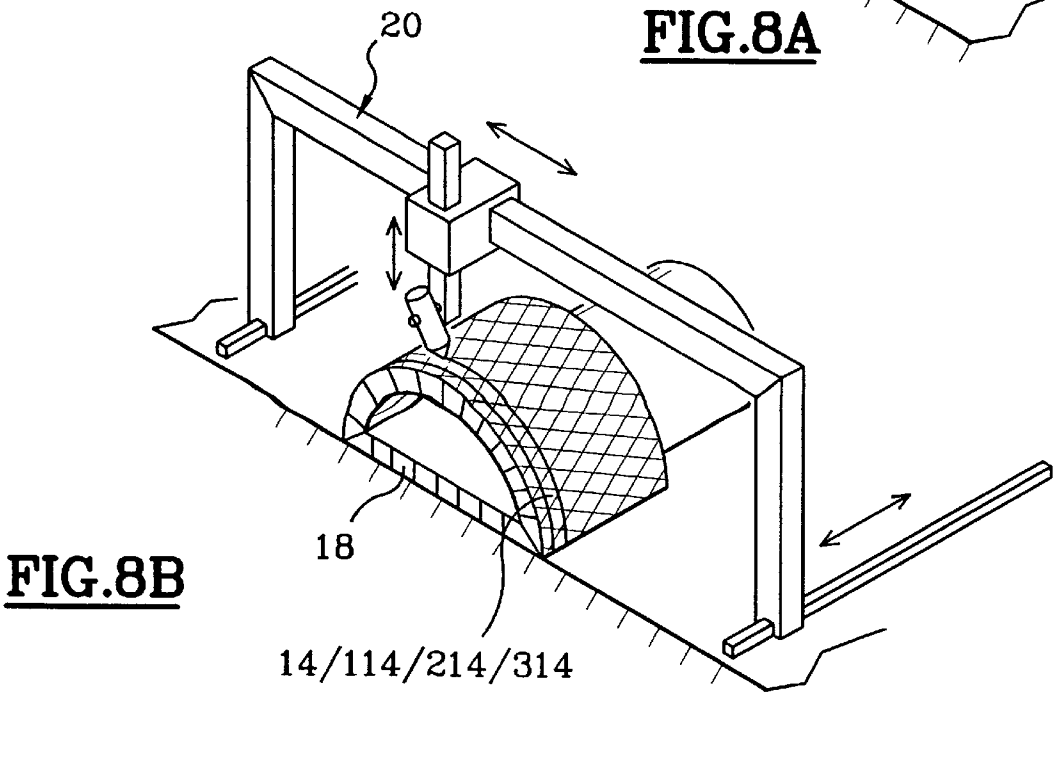
FIG.8B

ACOUSTICALLY RESISTIVE LAYER, PROCESS FOR PRODUCTION OF THIS LAYER AND ABSORBENT ACOUSTIC PANEL PROVIDED WITH AT LEAST ONE SUCH LAYER, AS WELL AS ITS PROCESS FOR PRODUCTION

CROSS REFERENCE TO RELATED APPLICATION

This application corresponds to French application 97 10490 of Aug. 13, 1997, the disclosure of which is incorporated herein by reference.

FIELD OF THE INVENTION

The present invention relates to an acoustically resistive layer particularly for use in the production of walls of nacelles of aircraft motoreactors, as well as the process for production of this layer, but also to an acoustically absorbent panel provided with at least one such layer.

BACKGROUND OF THE INVENTION

It is known that aircraft motoreactors generate substantial acoustic emissions against which steps must be taken with greatest effectiveness and as to which many improvements have been provided.

As in all technological advances, the greatest gains are quickly obtained with the current means that are well known, but to improve further the struggle against acoustic emissions, it is necessary to work very pointedly on combinations of materials, as in the present invention, the results obtained being significantly improved.

There will be selected in the description that follows, the example of walls of nacelles of aircraft motoreactors, because the explanations can be immediately comprehensible, but nevertheless the uses are very numerous in aeronautics, as well as in other fields such as gas turbines, heat engines or blowers and more generally all machines which generate substantial noise which should be damped under difficult conditions of temperature, pressure and/or mechanical resistance.

To damp noise, particularly through the walls, resonators of the Helmholtz type are used which permit attenuating in a reactive manner certain radial acoustic components under certain conditions of dimensioning of the material. Such a resonator comprises a hollow structure of the honeycomb type disposed between two resistive layers.

The honeycomb structure provides a cavity which permits attenuating by trapping certain noisy frequencies in a reactive manner.

The acoustically resistive layer has, in addition to its role of partitioning the hollow structure, a dissipating role, which is to say that it permits transforming acoustic energy into heat.

The present invention relates more particularly to the production of an acoustically resistive layer which permits obtaining physical attenuation by transformation of the acoustic energy into heat, particularly incident waves.

There are already known embodiments of such resistive layers made by combining a honeycomb structure and a total rear reflector.

A first example consists in using as the resistive layer perforated metal or composite sheet, which permits obtaining a single layer, high structural resistance and good control of the proportion of open surfaces.

On the other hand, this type of layer has high acoustical non-linearity, high dependence on tangential flow and low resistance to erosion in the case of a composite layer.

A second example is the combination of perforated metal sheet with metallic cloth or composite. In this case, there is achieved control of the porosity of the constituents and the possible adjustment of the proportion as well as the high structural resistance with supplemental advantages of moderated acoustic non-linearity and moderated dependence on flow.

By contrast, the layer is doubled, which requires a delicate assembly process, which is long and costly, with risks of acoustic inhomogeneity if this assembly has disparities, as well as the risk of corrosion. It should also be noted that the choice of the materials can be imposed by the requirements of assembly.

A third example of the prior art consists in combining a grill and a metallic cloth or composite.

In this case, the structural resistance is high and the phenomena of acoustic non-linearity and dependence on flow are moderated.

On the other hand, surface acoustic homogeneity is lacking, with risk of aerodynamic relief. Repeatability is difficult to obtain and the adjustment of the open proportion of the surface of the grill is delicate because there is a dispersion during fabrication and above all because of the unavailability of grills with adjustable surface area.

There can also be cited a fourth example which consists in using a metallic or synthetic cloth without structural reinforcement.

In this embodiment, there is a monolithic layer, low non-linearity, low dependence on tangential flow and good control of the proportion of porosity.

On the other hand, the structural resistance is unfortunately low, more particularly with cloths which have good properties of acoustic damping.

SUMMARY OF THE INVENTION

The object of the present invention is to provide an acoustically resistive layer with a proportion of open surface which is easily and precisely adjustable, which meets acoustic objectives, which meets structural requirements to resist underpressure during flight, that resists the weight of humans in certain portions as well as aerodynamic and inertial forces of the entry of air into the motor housing, for example in the particular case of an aircraft motor reactor nacelle. In such an application, this material must also permit resisting the "fan blade off" phenomenon, which is to say the phenomenon of losing a blade.

The resistive acoustic layer according to the invention must also resist erosion arising from the penetration of sand into the air flow, to electrical phenomena such as lightning striking or against corrosion.

This resistive layer must also permit an adjustment of the properties, not only mechanical but acoustical, by the combination of two materials whose assembly poses no problems.

The present invention also has for its object the process of production of this resistive layer as well as an acoustic panel made with this resistive layer.

The present invention also relates to a process of production of an acoustically absorptive panel provided with a resistive layer according to the invention, as well as the obtained panel.

To this end, the resistive acoustic layer according to the invention comprises at least one layer of acoustically shock absorbing cloth and a reinforcing material, characterized in that this reinforcing material comprises filaments, with adjustable proportion of open surface, secured to said acoustically damping cloth.

These filaments are disposed unidirectionally, bidirectionally or even multidirectionally.

The invention also has for its object a process of production of a resistive acoustic layer which consists in disposing the acoustically absorbing cloth on a mold shaped to the profile of the layer to be obtained and disposing on this acoustically absorbing cloth filaments impregnated with a binder by filament winding and withdrawing the layer thus obtained from the mold. In this case, the binder will have an adhesive capacity permitting it to remain secured to the acoustic cloth during handling, before final hardening of the panel, without a supplemental operation.

According to a modification, the process consists in disposing the acoustically damping material on a mold shaped to the profile of the layer to be obtained, and disposing on this acoustically damping material filaments impregnated with a binder with the application by deposition and application with pressure and withdrawing the layer thus obtained from the mold. In this case, the binder will have an adhesive capacity permitting it to remain secured to the acoustic cloth during handling, before final hardening of the panel, without a supplemental operation.

The invention also relates to panels thus obtained which comprise at least one external resistive layer secured to one of the surfaces of a honeycomb core whose other surface comprises a total reflector or several honeycomb core structures superposed with the interposition between these cores of a septum of the acoustically resistive layer type.

The invention also relates to a process for production of an acoustic panel comprising an acoustically resistive layer which comprises the following steps in this order or in the reverse order:

- emplacement of a mold shaped to the profile of the panel to be obtained,
- deposition of an acoustically damping cloth on the mold,
- filamentary winding of filaments impregnated with a binder to constitute a layer on the acoustically damping cloth,
- winding up in sheets or strips at least one honeycomb core on this layer of filaments, with interposition of an acoustically resistive layer between two successive cores,
- rolling up or winding a final layer of a total acoustic reflector, and
- withdrawing the panel from the mold.

There can also be provided an intermediate operation of hardening the binder.

The invention also covers the acoustically damping panel obtained.

According to a modification, the process comprises the following steps:

- emplacement of a mold conforming to the profile of the panel to be obtained,
- laying an acoustically damping cloth on the mold,
- depositing and applying pressure to filaments impregnated with a binder to constitute a layer on the acoustically damping cloth,
- rolling up in strips or sheets at least one core of honeycomb structure on this layer of filaments, with the interposition of an acoustically resistive layer between two successive cores,
- rolling up or winding a final layer of a total acoustic reflector, and
- withdrawing the panel from the mold.

There can also be provided an intermediate operation of hardening the binder.

The invention also relates to the acoustically damping panel obtained by the practice of this modification of the process.

BRIEF DESCRIPTION OF THE DRAWINGS

The invention will now be described with respect to the accompanying drawings, which show several embodiments, in the various figures, in which:

- FIGS. 7A to 7E show a synopsis of the steps of the process for the production of an acoustically absorptive panel having an acoustically resistive layer according to the invention by filament winding,
and
- FIGS. 8A to 8E show a synopsis of the steps of the process for the production of an acoustically absorptive panel having an acoustically resistive layer according to the invention by deposition application of pressure.

DESCRIPTION OF THE PREFERRED EMBODIMENT

Figure 1:
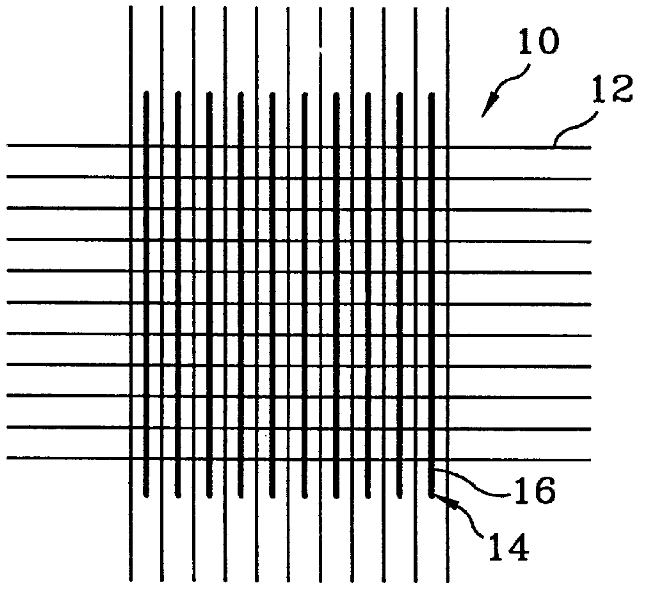
- FIG. 1 is a first embodiment of the unidirectional type.

In FIG. 1, there is shown an acoustically resistive layer 10 according to the invention which comprises an acoustically damping cloth 12 and a layer 14 of reinforcement comprising filaments 16.

In the description which follows, "filaments" means filaments, strips of filaments, wicks, plaits, or strands of filaments, of square, round or rectangular section. Similarly, so as to use uniform terms, a "mold" can be a static mold, a mobile translatory mold, or a rotatable mandrel. As to the term "layer" it can correspond to several thicknesses of mono or multidirectional filaments.

The acoustically absorptive cloth 12 is for example a cloth made from a stainless steel grid and sold under the mark GANTOIS.

In the first embodiment of FIG. 1, the layer 14 of reinforcement is single and comprises unidirectional filaments oriented in the warp or weft direction of the acoustically absorptive cloth as shown in FIG. 1 or else in a direction making any angle with the warp or weft filaments.

The density of the filaments of the layer is adjusted as a function of the required amount of acoustic opening, the desired mechanical resistance, as a function of the nature of the filaments, of their cross section, of the acoustically damping cloth whose damping qualities must be preserved, as a function of the panel on which said acoustically resistive layer must be connected as a function of the binder used to connect this layer to the acoustically damping cloth.

Figure 2:
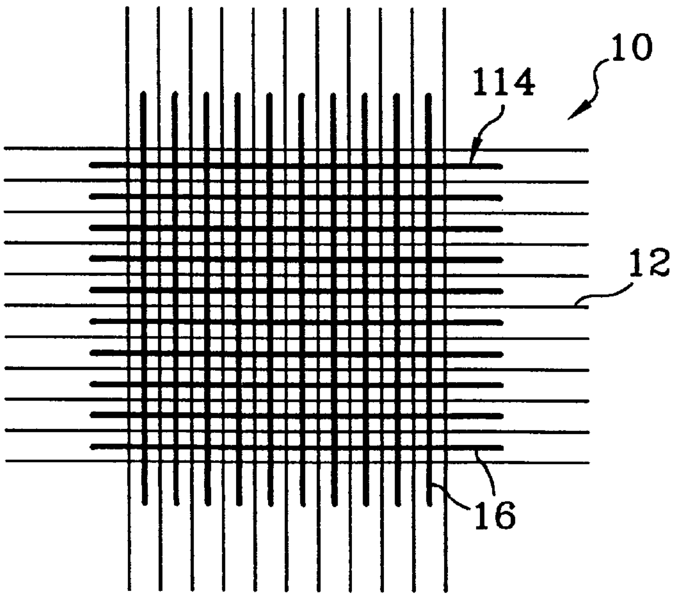
- FIG. 2 is a second embodiment of the bidirectional type with a crossing angle of 90°.

The acoustically resistive layer 10 can be made with the same acoustic cloth 12 but with a bidirectional layer 114, the crossing of the filaments taking place at an angle of 90°, oriented parallel to the warp and weft filaments of the acoustically damping cloth as shown in FIG. 2, or at any angle.

Figure 3:
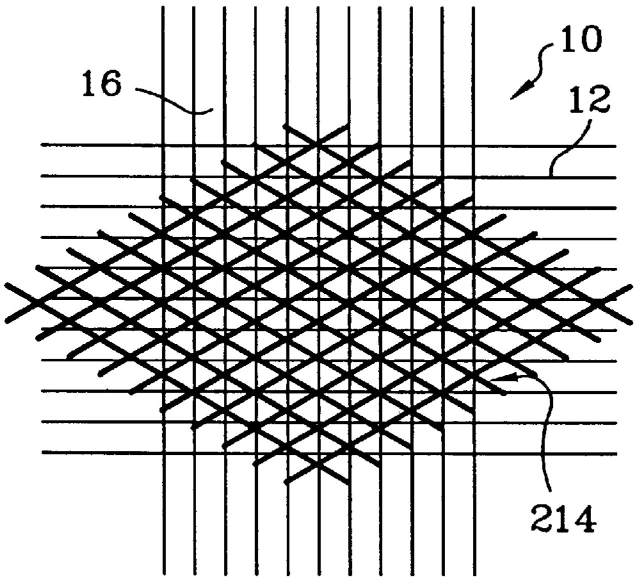
- FIG. 3 shows a third embodiment of the bidirectional type with an identical crossing angle but of any value.

In FIG. 3, the layer 214 is bidirectional with a filament orientation at an angle different from 90°, these filaments themselves making an angle different from 90° with the warp and weft filaments of the acoustically damping cloth.

Figure 4:
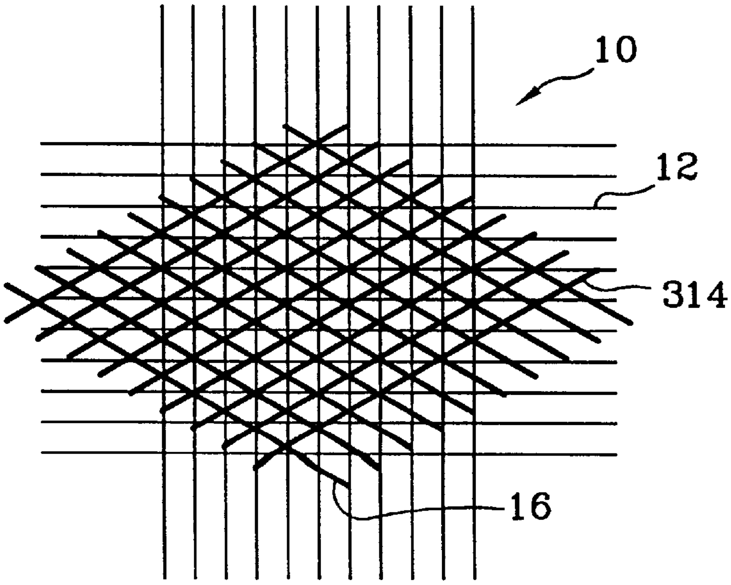
- FIG. 4 shows a fourth embodiment of the multidirectional type.

In FIG. 4, the layer 314 is multidirectional with different orientations between the filaments of the layer and the warp and weft filaments of the acoustically damping cloth.

Figure 5A:
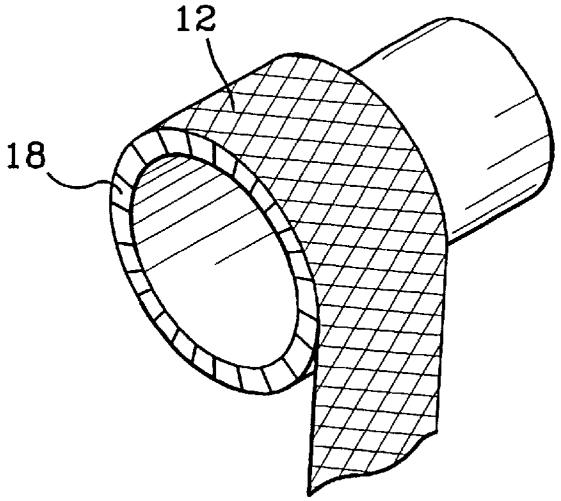
- FIGS. 5A to 5C show a synopsis of the steps of the process for the production of an acoustically resistive layer according to the invention by filament winding.
Figure 5B:
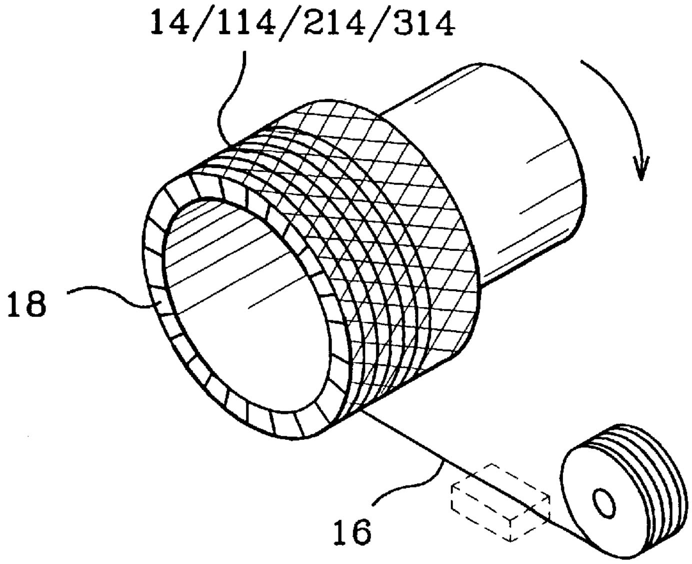
Figure 5C:
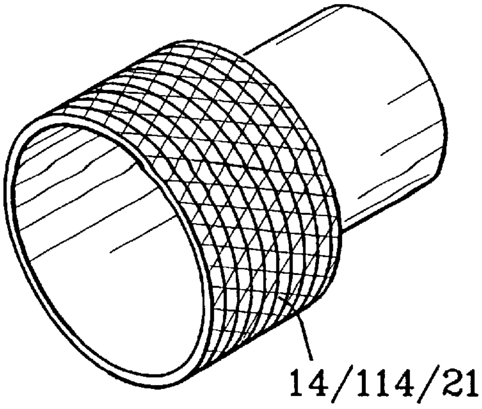

In FIGS. 5A, 5B and 5C, there is shown a synopsis of the process of production which consists in having a mold 18, in this case that of the nacelle of an aircraft motoreactor, on which is laid the acoustically damping cloth 12 to produce the first portion of the resistive damping layer. The emplacement of this cloth is preferably carried out by strip winding for example if the cloth is present in strips.

Then, the filamentary winding of the filaments takes place as shown in step 5B, which winding permits producing a bobbin with the desired pitch and angles, including varying them according to the locality so as to increase or decrease the density.

The filaments can be of different types, such as carbon, glass or "Kevlar" filaments sold by the firms BROCHIER or HEXEL.

These filaments are saturated with a binder such as a resin designated 914 and sold by BROCHIER, which permits good connection between the cloth and the filaments of the layer.

The mold 18 is then withdrawn. To do this, preferably, there is provided a retractable and reusable mold or a lost mold which is destroyed with recovery of the final layer.

In the case of certain shapes of members with molds having closed surfaces or not having a profile of revolution, it may be necessary to produce the layer 14, 114, 214 or 314 of filaments by laying and application of pressure. This is preferably carried out with a bench 20 and a relative movement along the necessary axes, between the mold and said bench.

Figure 6A:
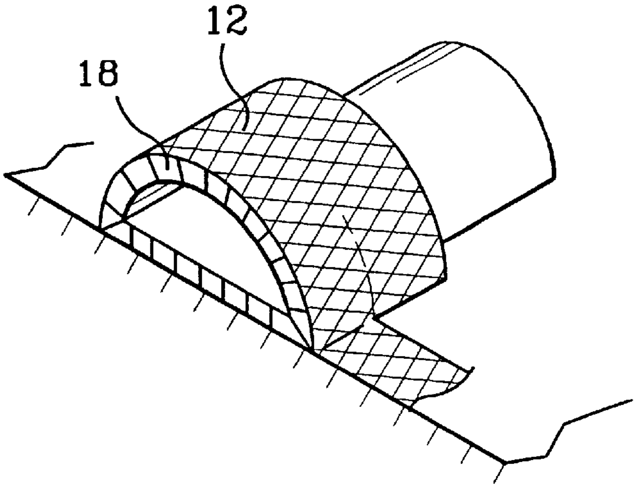
- FIGS. 6A to 6C show a synopsis of the steps of the process for the production of an acoustically resistive layer according to the invention by deposition and application of pressure.
Figure 6B:
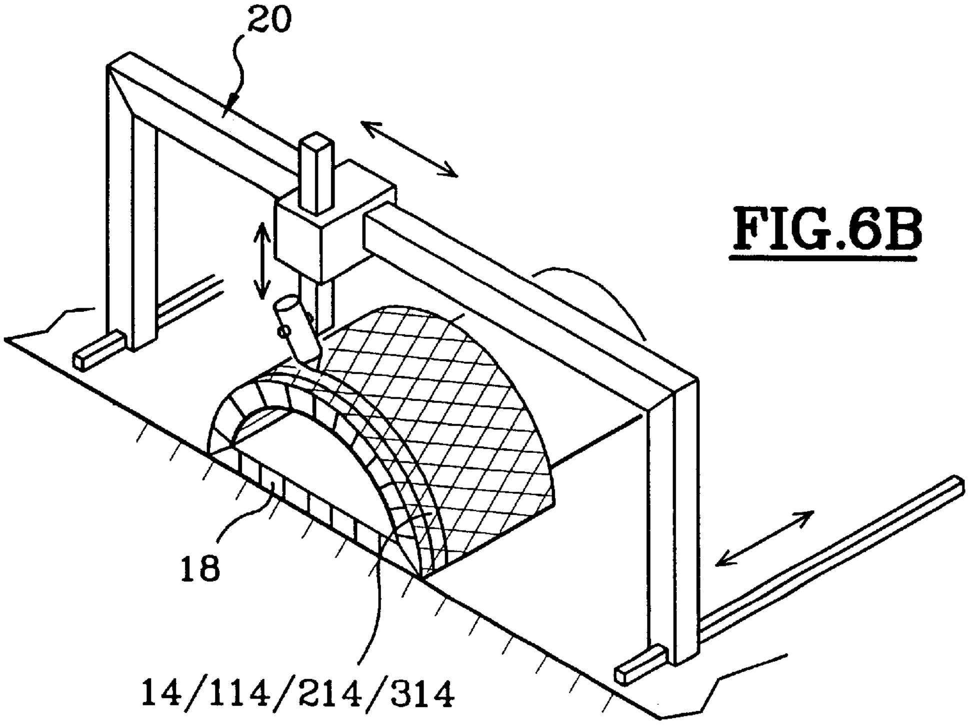
Figure 6C:
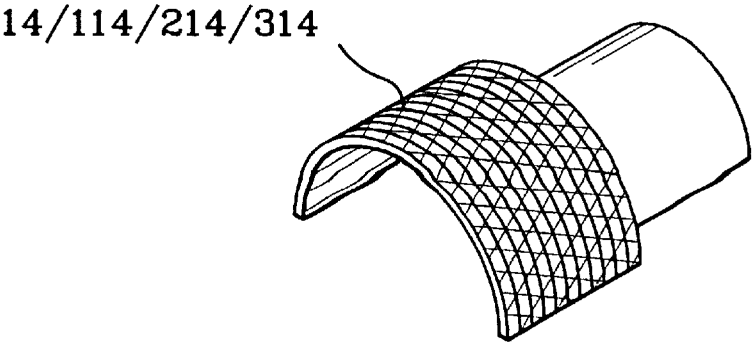

In FIG. 6A, the mold is shown in a simplified manner as being the half-mold of a nacelle. In this case, the piece is immobilized and the bench is movable but the reverse could also be done.

On this mold there is deposited the acoustically damping tissue by any suitable means such as winding or compacting.

Once the cloth is in place, the impregnated filaments are deposited and pressure applied, as before.

The same advantages are realized with the deposition of filaments with variable densities as needed.

The shaped layer is then withdrawn from the mold for use in combination with other layers to form a panel having a surface facing the source of noise with a resistive damping capacity.

Figure 7A:
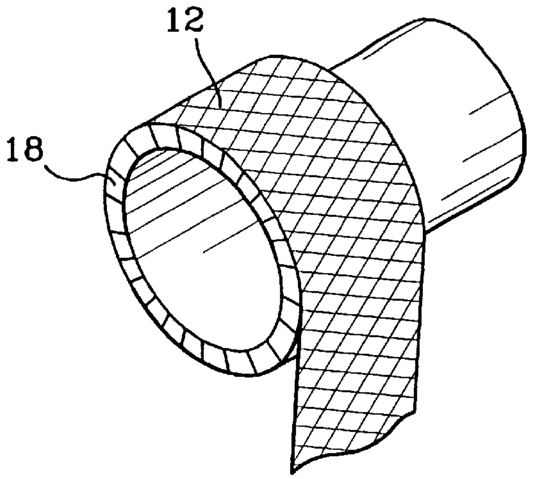
Figure 7B:
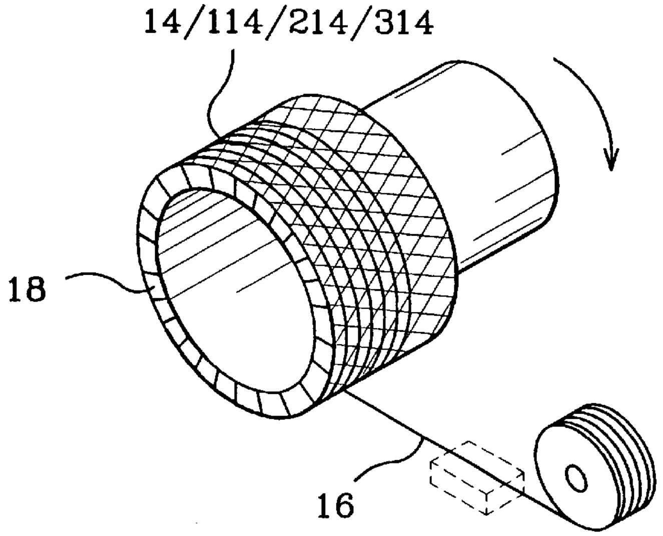
Figure 7C:
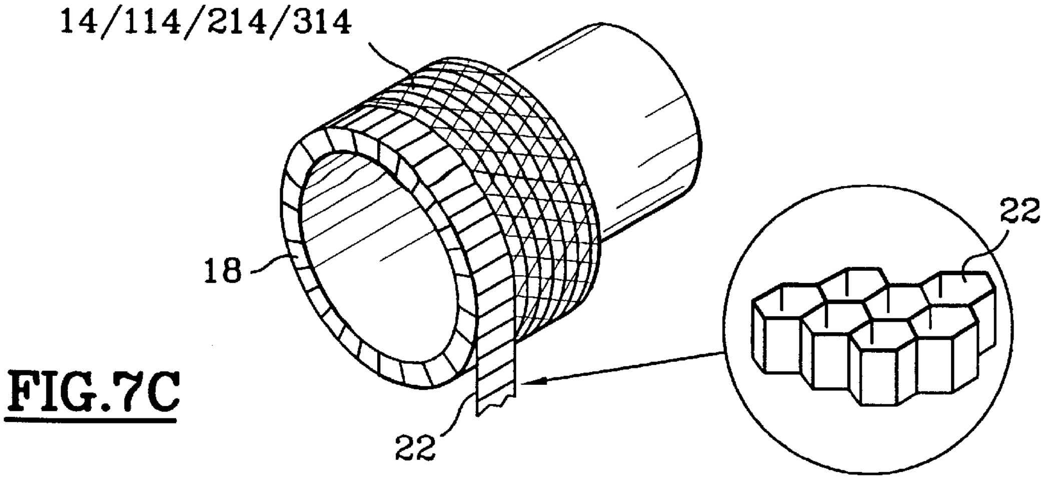
Figure 8C:
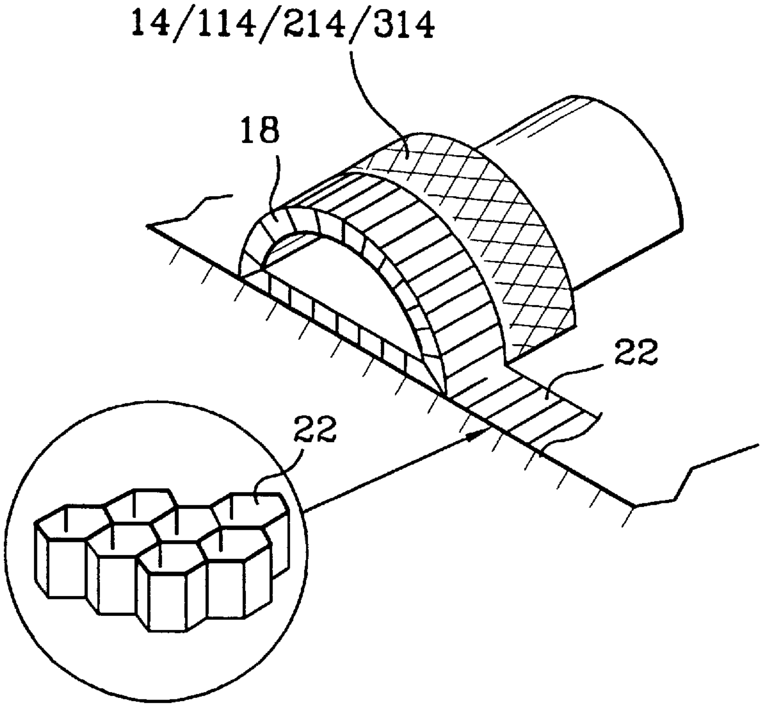
Figure 8D:
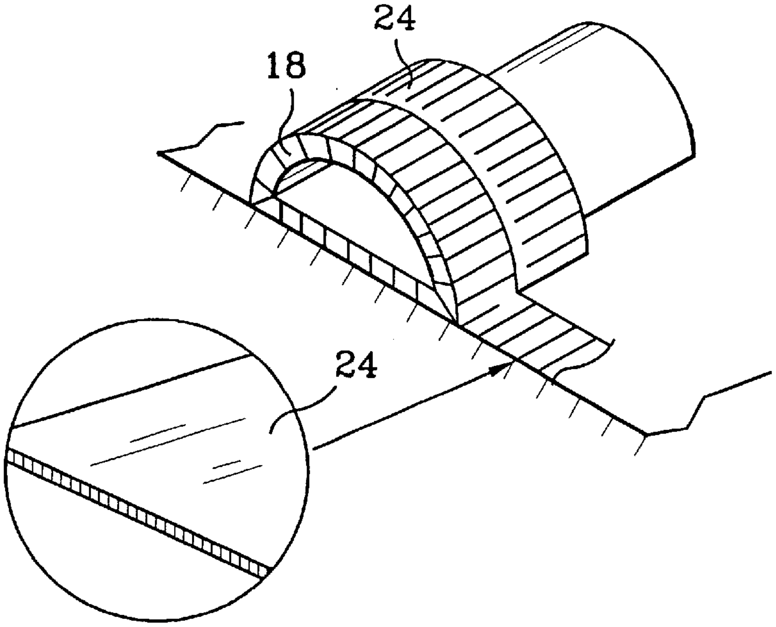
Figure 8E:
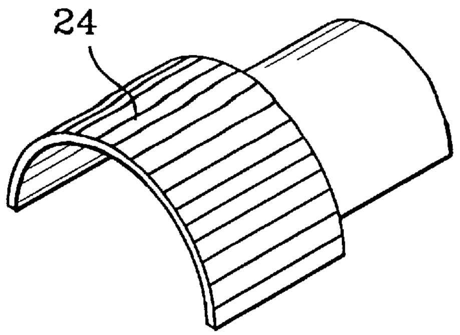

This monolithic layer can be connected to one of the surfaces of a preformed panel having a honeycomb structure forming a core 22, of the honeycomb type, with a total reflector 24, secured to the opposite surface of the panel, of the same type as those shown in FIGS. 7C and 7D.

This panel can also comprise a so-called external acoustically resistive layer, several layers of superposed honeycomb and between two superposed layers of honeycomb there can be interposed a septum in the form of an acoustically resistive layer, according to the invention. It is also suitable to provide layers having complementary characteristics and adapted to achieve the best damping, as will be understood by those skilled in the art.

In FIGS. 7A to 7E, there is shown the synopsis of a process for producing a panel having at least one acoustically resistive layer, using filamentary winding for emplacing filaments of reinforcement on the acoustically damping cloth. Thus the two first steps of FIGS. 7A and 7B are identical to the steps 5A and 5B.

By contrast, in step 7C, a honeycomb core 22 is wound directly on the layer of filaments, the connection being ensured either by preliminary reticulation of the honeycomb, or by using the binder of the resistive layer.

In this embodiment of a product having an axis of revolution, this operation is carried out by wrapping.

On this honeycomb core, there will be applied definitively a total reflector, see FIG. 7D.

It is desirable in this case to provide a binder disposed at the interface between the honeycomb core and the total reflector 24.

Withdrawal of the mold permits, as shown in FIG. 7E, having an acoustic damping panel of the HELMHOLTZ cell type, with at least one damping layer of resistive type.

It is also possible to make a panel with several superposed honeycomb layers, and in this case as many honeycomb cores are wound as needed to obtain the desired effects, being careful to interpose if needed septa between each layer of cores, in the form of other acoustically resistive layers such as those which have been described, unidirectional, bidirectional or multidirectional.

In FIGS. 8A to 8E, there is shown the counterpart of what is shown in FIGS. 7A to 7E, but with the laying and application of filaments under pressure, and a laying of the honeycomb cores and of the total reflector by wrapping.

The withdrawal of the mold permits obtaining a shaped panel having interesting damping qualities.

The advantages of the resistive layer and of the panels according to the invention using this layer are numerous. Essentially, it is possible to control and adjust the amount of opening, to produce deposits with high precision and excellent repeatability, to satisfy the acoustical objectives and the structural requirements.

Moreover, the use of layers, because of their flattened form, increases the connecting surface, which ensures a high quality of assembly.

Such sheets permit obtaining good acoustical homogeneity but also non-linearity and dependence with moderated tangential flow.

The resistance to erosion is good and the risk of aerodynamic relief are suppressed.

It will also be noted that the reinforcing filaments can be deposited with the same mold and that the acoustic damping cloth can be draped or wrapped on these filaments according to the use intended for the panel and according to its shape.

There should also be noted a great advantage which results from the process according to the present invention, which is to produce the acoustic panel in a single piece. Thus, the number of joints is reduced, which leads to increasing the effective acoustic surface, decreasing the mass and simultaneously reducing the costs of production.

In the different figures, the representation of the reinforcing filaments on the acoustic cloth has been simplified, essentially for reasons of clarity and to facilitate comprehension of these figures.

It is of course to be understood that the interval of the reinforcing filaments is not necessarily connected to the interval of the weft or the interval of the warp of the acoustic damping cloth. Therefore, any arrangements of reinforcing filaments are comprised in the present invention as a function of what is needed.

It will also be noted that the resistive layer thus produced in situ can follow any profile of mold having a developable or non-developable shape.

The process of production permits obtaining panels having complex shapes with point reserves to permit the production of openings or recesses, in any case of winding of the filaments of the reinforcing sheet, unidirectional, bidirectional or multidirectional.

What is claimed is:

1. A sound damping panel, comprising an acoustically resistive layer comprising at least one layer of acoustic damping cloth; a reinforcing material comprising a sheet of filaments secured to said acoustically damping cloth; and an external resistive layer on one of the surfaces of a core of cellular structure whose other surface comprises a total reflector.

2. The sound damping panel according to claim 1, which comprises several superposed cellular cores with the interposition between these cores of a septum comprising an acoustically resistive layer.

3. The sound damping panel according to claim 1, wherein the filaments are disposed unidirectionally.

4. The sound damping panel according to claim 1, wherein the filaments are disposed bidirectionally.

5. The sound damping panel according to claim 1, wherein the filaments are disposed multidirectionally.

* * * * *